Figure 1:
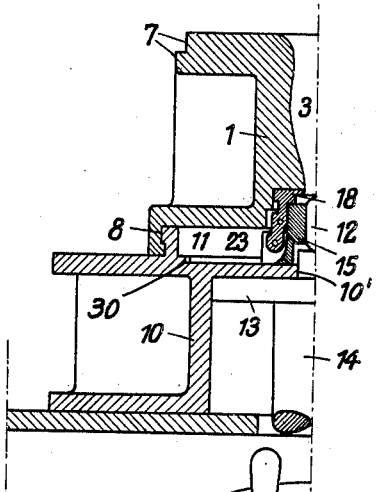

Feb. 27, 1934.　　　A. SCHILLER　　　1,948,682
MANUFACTURE OF GLASSWARE
Filed May 20, 1929　　　3 Sheets-Sheet 1

Inventor:
Adolf Schiller,

Feb. 27, 1934.   A. SCHILLER   1,948,682
MANUFACTURE OF GLASSWARE
Filed May 20, 1929   3 Sheets-Sheet 3
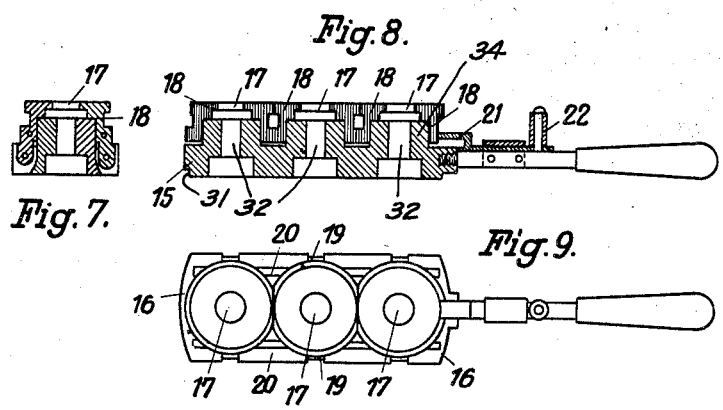

Patented Feb. 27, 1934

1,948,682

UNITED STATES PATENT OFFICE 1,948,682

MANUFACTURE OF GLASSWARE

Adolf Schiller, Berlin-Schoneberg, Germany

Application May 20, 1929, Serial No. 364,596
In Germany May 21, 1928

7 Claims. (Cl. 49—9)

I have filed patent applications in Germany May 21, 1928 and April 17, 1929; Czechoslovakia January 11, 1929.

This invention relates to hand machines for the manufacture of hollow glass ware with narrow and wide necks in which a plurality of blanks (parisons) are blown preliminarily in inverted parison moulds, each having a vertical reciprocating mandrel cooperating therewith, the finishing blowing of the parisons taking place in upright finishing moulds while the parisons are held by head moulding tongs.

According to this invention the different sets of operating elements of the machine, for instance, parison moulds, head moulding tongs, mandrels etc. have a circular or arc shaped outline adapted to be used for centering the sets of operating elements relatively to one another. Thus, all the machine parts of which each comprises at least two operating elements, intended to cooperate with their elements in concentric superposition in the manufacture of a glass vessel, are machined one after another with the use of base plates with an arc-shaped or circular circumferential boundary in a machine with a turning tool (lathe, drilling machine etc.). A chuck provided with circular guides, is firmly fixed in the tool, with an eccentricity depending on the desired distance of the mould hollows, and there is introduced into one of the circular guides of the said chuck the base plates of the machine parts (mandrels, head tongs etc.) which are to be machined (chiefly to be drilled.) The required machining (drilling) is then effected in each of these base plates successively at the different points by means of the tool, by turning the base plate only in the circular guide of the chuck.

This fully ensures that the machining in the different positions of the base plate, will take place at the points of the same eccentricity, and that exactly the same eccentricity will be used also for the points to be machined of the base plates which are successively introduced into the fixed chuck. By control of the angular setting of the base plates in the chuck, it is possible to obtain without any difficulty the required exact coincidence of the working points (holes) in the various base plates. As a rule it is advisable to arrange the various mould hollows in a straight line next to one another, in which case at each insertion of a base plate into a circular guide of the chuck, the base plate must be turned in the circular guide to exactly 180° after the first machining is finished.

If a central machining of the base plate is effected in combination with the making of the circular edge boundary, it is possible in that way to produce, at each insertion of each base plate into the fixed chuck of the machine, by turning the base plate to 180°, in addition to the central place of machining, also two further places of machining, arranged diametrically of the same and at exactly the same distance, that is to say to carry out the machining for one mould set with three openings.

When instead of three, there are to be five mould hollows in a row, it is necessary, after the various base plates with the circular outline have been machined with the invariable fixed eccentricity of the chuck at two places with turning to 180°, to re-set the chuck to an eccentricity adapted to the distance now desired for the mould hollows, and thereupon to repeat in the same way the machining of the base plate with this new setting of the chuck.

In order to avoid any difficulties in withdrawing the finished glass vessels from the head moulding tongs, it is advisable to provide the latter with hinged jaws in a known manner and to connect together the hinged jaws allotted to the mold hollows arranged side by side, so that the jaws open automatically relatively to each other.

The accompanying drawings are intended to elucidate the invention and the manner of carrying it into practical effect.

Figure 2:
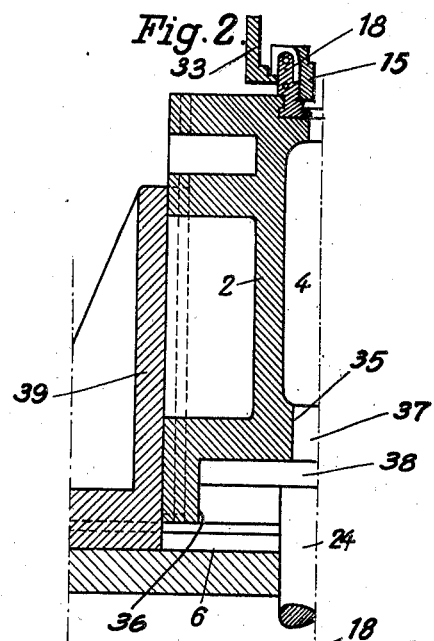
Figure 3:
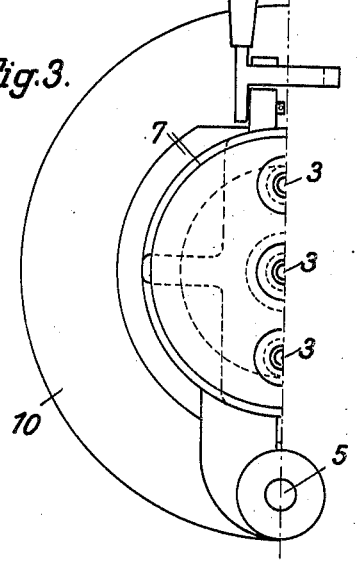
Figure 4:
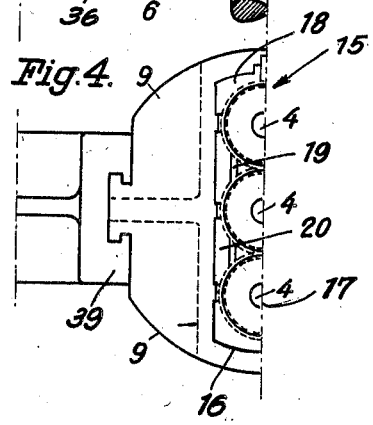
Figure 5:
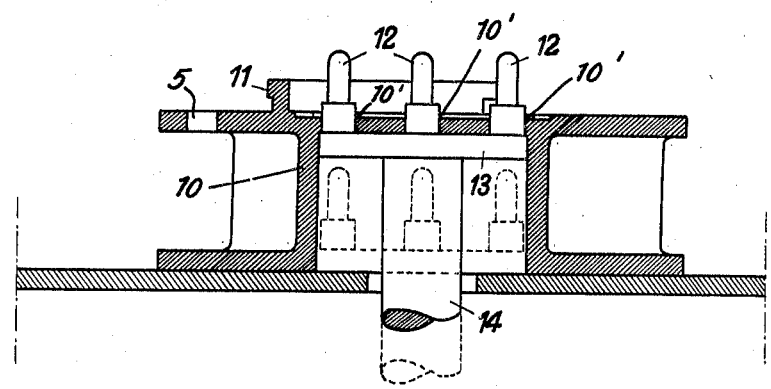
Figure 6:
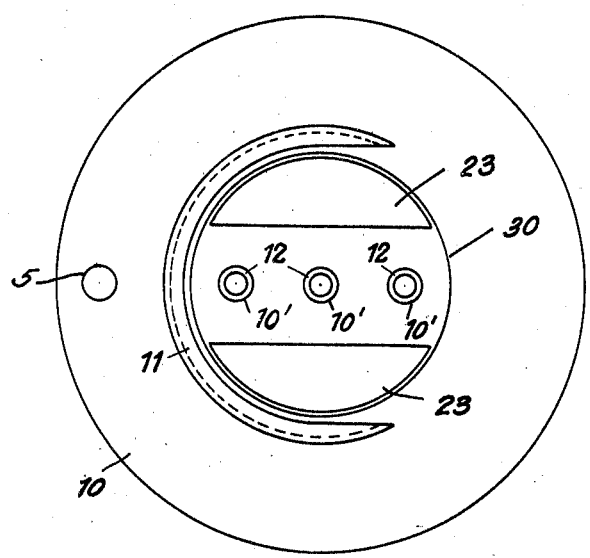

Fig. 1 is a transverse vertical section through one half of a parison mold in position on its supporting and pontil structures and a head mold in position, Fig. 2 is a similar view of a finishing mold with its supporting pontil structures and a head mold in position, Figs. 3 and 4 are top plan views of the structure shown in Figs. 1 and 2 respectively, Fig. 5 is a longitudinal vertical section through the rough mold supporting and pontil structures of Fig. 1, with the pontil structure shown in its lowered position by means of broken lines, Fig. 6 is a top plan view of the structure shown in Fig. 5, Figs. 7, 8, and 9 are transverse sectional, longitudinal sectional and top plan views respectively of the head mold, and Fig. 10 is a side elevational view partly in section of the apparatus for machining the several elements of the molding apparatus.

The arrangement for sucking in the glass, for the preliminary blowing and for the finishing blowing, may be of any desired known kind and are not shown in the drawings.

The rough mould is marked 1 and the finishing mould 2, and each of them is provided with three mould hollows 3 or 4 arranged in a row. The rough mould comprises two halves pivoted about a pin 5, whilst the halves of the finishing mould 2 are adjustable parallel to each other in guides 6.

The body containing the preliminary or rough mould hollows 3, has an outer circular outline 7, 8 of which only the outline 7 is closed in a circle, whilst the outline 8 is merely an arc of a circle. Similarly, the body of the finishing mold has an arcuate outline 9.

The preliminary or rough mould support is marked 10. It is provided on its upper side with a projecting flange 11 in the form of an arc of a circle, and with the openings 10' for the passage of the mandrels or pontils 12. The pontils are mounted on a plate 13 which is supported by a shaft 14.

The body of the head moulding tongs is marked 15. It is of prismatic shape, but its ends form arc sections 16 of a circular outline. The head moulding hollows 17 are formed in hinged jaws 18 which are pivoted about hinge pins 19. 20 are coupling rods connecting together each three jaws situated at the same side of the mould hollows. 21 is the closing slide for the jaws of the tongs, and 22 the handle for operating it. 23 are the supports for the rough mould body 10 for guiding the head moulding tongs, and 24 is the vertically adjustable support of the finishing mould bottom.

The preliminary mold support 10 is provided at its upper surface with a central depression having a circular boundary edge 30 concentric to the projecting arc-shaped flange 11, said edge contacting with the edge 31 of tongs 15 when said tongs are in operative position with the axis of its middle guiding channel 32 for the middle mandrel 12 coinciding with the axis of said circular edge 30. The frame of the machine (not illustrated) is provided with a member 33 forming a preliminary support for the tongs prior to their being grasped and centered by the finishing mold 2, the centering being effected on closing of the mold by the tongs' jaws 18 being grasped by the finishing mold's cavities when the mold is closed. The jaws 18 on their side being centered with relation to the channels 32 of the tongs 15 by the cylindrical protuberances 34 concentric with said channels.

Formed in the halves of the finish mold are openings 35 communicating with a larger opening 36. The pontils 37 carried on plate 38 are positioned to enter the openings 35 by the plate 38 reciprocating in opening 36. The members 39 sliding in parallel guides 6 carry the mold halves 2.

The working of the machine is the same as that of the usual hand machines, except that at each operation the liquid glass has to be cut in not only one rough mould hollow, but into several hollows (according to Figure 3).

With regard to the filling of the several juxtaposed rough mould hollows a special manner of operating has proved particularly advantageous and of high importance.

In cutting in the soft glass into an inverted rough mould for manufacturing blanks for glass vesels it is customary to cut the glass for the filling of each mould from a lump of glass freshly taken from the furnace. In operating in this manner in using a multiple mould in conformity with this invention, for instance a mould with three cavities, three separate lumps would be required. This would highly complicate the manufacture and increase the expenses.

Now it has been found that the common assumption according to which the filling of an inverted rough mould requires a lump of glass freshly taken from the furnace is wrong and that there is no need to avoid the feeding of the mould with a portion of glass cut from a lump from which another portion had already been cut, because the cooling of the glass by contact with the scissors-blades in fact does no harm. Therefore a special step of this invention consists therein that the several adjacent cavities of a multiple rough mould are fed with soft glass by successively cutting the required plurality of portions from a single lump. Of course quick working is required in order to obtain high grade products.

The drawing-in or sucking-in and the preliminary blowing of the blank or ball then take place simultaneously in all the three rough moulds, the remarkable feature being that the preliminary blowing is effected in open moulds; although owing to this, in view of several blanks being simultaneously rough blown, it is impossible to control the degree of the preliminary or rough blowing. It has been found however, that the want of uniformity in the degree of blowing of the blank which then takes place, does not have any injurious effect on the finished product. After the preliminary blowing of the blanks has been done, the head moulding tongs are transferred in the usual manner into the finishing mould 2, and the latter is closed round the head moulding tongs by moving its halves in the guides 6. After the blowing is finished, the head moulding tongs are opened again, the tongs are withdrawn and the hinged jaws of the three moulds opened simultaneously by opening the closing slide 21, owing to the coupling of the jaw halves.

Whilst the rough moulds are being opened by turning their halves about a hinge pin 5, the opening and closing of the finishing moulds is effected by a parallel movement of their halves relatively to each other. This is due to the finishing blowing producing an increase of width of the articles, so that the opening of the finishing moulds by a turning movement in the case of simultaneous manufacture of several articles, would require an undesirably great angular movement of the halves.

The exact centering of the parts is ensured everywhere by the circular boundary lines of the co-operating parts, relatively to which the operative machine parts (pontils, mould hollows etc.) are in exact position during the manufacture.

The machining of the co-operating machine parts is effected, after they or their base plates have been given definite circular outline, in the machine chuck 25 which is shown in Figure 10. This machine chuck has several circular recesses 25a into which may be inserted with a suitable fit the circular outlines of the machine parts to be machined or of their base plates as shown in Figure 10 for the rough mould part 1. The chuck 25 is adjustable relatively to the machine part 26 by means of sliding jaws 27 which are guided in a straight line in the machine part 26, so that it may be given any desired eccentricity relatively to the axis of rotation of the lathe or of the drilling machine.

Assuming then that the line 28 represents the axis of rotation of the tool, the machining of the piece of work inserted in the chuck 25 may be effected along the said line. A working opening is produced at a certain distance from the axis 29 of the circular outline of the work which is inserted in one of the circular recesses 26 of the chuck. When the work is then turned in the circular recess of the chuck to 180° without any variation in the setting of the chuck 25, there will be produced during the repeated machining a further hollow in the work at a point situated at the other side of the axis 29 of the circular outline, which is, diametrically opposite the first one and at exactly the same distance from the axis 29.

In that way, it is possible to drill exactly in the supporting plate 13 the holes for the pontils 12, and in the same way to produce also the mould hollows for the rough mould and the finishing mould as well as to machine the hollows of the head moulding tongs, so that in all the parts the distances will be exactly kept and accordingly, when with the use of the circular outlines of the parts for the centering, the single parts are brought to a correct position relatively to one another, the co-operating superposed machine parts, for instance in the manufacture of the blank or ball, the pontils 12, the mould hollows of the head tongs and the hollows of the rough mould, will be exactly concentric for all the glass vessels to be manufactured.

What I claim is:

1. Apparatus for forming hollow glassware and of the type including a parison mold structure having a plurality of molding means, a finish mold structure having a plurality of molding means and a head mold structure adapted for successive engagement with said parison and finish mold structure and having a plurality of molding means shaped to register successively with the molding means of the parison and finish mold structures characterized in that each of said structures have a surface having the shape of at least a portion of a right circular cylinder and in that the said molding means are arranged on their respective structures with their center lines lying symmetrically about the axis of the cylindrical surface and in a plane passing through said axis.

2. Apparatus for forming hollow glassware and of the type including, a parison mold element having a plurality of molding cavities, and a head mold element having a plurality of molding cavities arranged to register with said first molding cavities, characterized in that each of said elements has a surface having the form of at least a portion of a right circular cylinder and shaped to engage the other surface to mutually position said elements, and further characterized in that said molding cavities are arranged on their respective elements with their center lines lying symmetrically about the axis of the cylindrical surface and in a plane passing through the said axis.

3. Apparatus for forming hollow glassware and of the type including a parison mold element having a plurality of molding cavities, a head mold element having a plurality of molding cavities adapted to register with said first molding cavities, a parison mold supporting element having a plurality of pontil guiding openings registering with said molding cavities, and a pontil plate element slidable in said supporting element and having a plurality of pontils arranged to penetrate said guiding openings and the molding cavities in said head mold element characterized in that each of said elements has a surface having the form of at least a portion of a right circular cylinder and shaped to engage another of said surfaces to mutually position the respective elements and further characterized in that said molding cavities, guiding openings and pontils are arranged on their respective elements with their center lines lying symmetrically about the axis of the cylindrical surface and in a plane passing through the said axis.

4. Apparatus for forming hollow glassware and of the type including a parison mold element having a plurality of molding cavities, a finishing mold element having a plurality of molding cavities, and a head mold element shaped to engage said parison mold element and said finishing mold element successively and having a plurality of molding cavities arranged to register successively with said other molding cavities characterized in that each of said elements has a surface having the form of at least a portion of a right circular cylinder and shaped to engage the other surfaces to mutually position said elements successively, and further characterized in that said molding cavities are arranged on their respective elements with their center lines lying symmetrically about the axis of the cylindrical surface and in a plane passing through the said axis.

5. Apparatus for forming hollow glassware and of the type including, a finish mold element having a plurality of molding cavities, and a head mold element having a plurality of molding cavities arranged to register with said first molding cavities, characterized in that each of said elements has a surface having the form of at least a portion of a right circular cylinder and shaped to engage the other surface to mutually position said elements, and further characterized in that said molding cavities are arranged on their respective elements with their center lines lying symmetrically about the axis of the cylindrical surface and in a plane passing through the said axis.

6. Apparatus for forming hollow glassware and of the type including, a finishing mold element having a plurality of molding cavities, a pontil plate element slidable in said finishing mold element and having a plurality of pontils arranged to penetrate said cavities and a head mold element having a plurality of molding cavities arranged to register with the first molding cavities characterized in that each of said elements has a surface having the form of at least a portion of a right circular cylinder and shaped to engage another of said surfaces to mutually position the respective elements and further characterized in that said molding cavities and pontils are arranged on their respective elements with their center lines lying symmetrically about the axis of the cylindrical surface and in a plane passing through the said axis.

7. Apparatus for forming hollow glassware and of the type including a parison mold element having a plurality of molding cavities, a finishing mold element having a plurality of molding cavities, and a head mold element shaped to engage said parison mold element and said finishing mold element successively and having a plurality of molding cavities arranged to register successively with said other molding cavities, a parison mold supporting element having a plurality of pontil guiding openings registering with said molding cavities, and a pontil plate element slidable in said supporting element and having a plurality of pontils arranged to penetrate said guiding openings and the molding cavities in said head mold element, a pontil plate element slidable in said finishing mold element and having a plurality of pontils arranged to penetrate said cavities therein, characterized in that each of said elements has a surface having the form of at least a portion of a right circular cylinder and shaped to engage another of said surfaces to mutually position the respective elements and further characterized in that said molding cavities, guiding openings and pontils are arranged on their respective elements with their center lines lying symmetrically about the axis of the cylindrical surface and in a plane passing through the said axis.

ADOLF SCHILLER.